(12) United States Patent
Sevinc et al.

(10) Patent No.: US 11,541,649 B2
(45) Date of Patent: Jan. 3, 2023

(54) METHODS AND FORMULATIONS FOR BONDING DISSIMILAR MATERIALS

(71) Applicant: CareFusion 303, Inc., San Diego, CA (US)

(72) Inventors: Zehra Sevinc, Franklin Lakes, NJ (US); Tea Datashvili, Franklin Lakes, NJ (US); Fanqing Meng, Franklin Lakes, NJ (US); Shang-Ren Wu, Franklin Lakes, NJ (US); Chinnu Brahatheeswaran, Franklin Lakes, NJ (US)

(73) Assignee: CAREFUSION 303, INC., San Diego, CA (US)

(*) Notice: Subject to any disclaimer, the term of this patent is extended or adjusted under 35 U.S.C. 154(b) by 403 days.

(21) Appl. No.: 16/574,635

(22) Filed: Sep. 18, 2019

(65) Prior Publication Data

US 2020/0086620 A1 Mar. 19, 2020

Related U.S. Application Data

(60) Provisional application No. 62/733,516, filed on Sep. 19, 2018.

(51) Int. Cl.

| | |
|---|---|
| *B32B 37/12* | (2006.01) |
| *C09J 5/00* | (2006.01) |
| *C09J 11/06* | (2006.01) |
| *C09J 11/08* | (2006.01) |
| *C09J 151/06* | (2006.01) |

(52) U.S. Cl.
CPC ............... *B32B 37/12* (2013.01); *C09J 5/00* (2013.01); *C09J 11/06* (2013.01); *C09J 11/08* (2013.01); *C09J 151/06* (2013.01); *B32B 2323/00* (2013.01); *B32B 2369/00* (2013.01); *C09J 2423/04* (2013.01); *C09J 2427/006* (2013.01); *C09J 2431/00* (2013.01); *C09J 2451/00* (2013.01); *C09J 2455/006* (2013.01); *C09J 2469/006* (2013.01)

(58) Field of Classification Search
CPC . B32B 37/12; B32B 2323/00; B32B 2369/00; C09J 5/00; C09J 11/06; C09J 11/08; C09J 151/06; C09J 2423/04; C09J 2427/006; C09J 2431/00; C09J 2451/00; C09J 2455/006; C09J 2469/006; C09J 2453/006; B29C 65/4815; B29C 65/4895; B29C 65/8215; B29C 66/71; B29C 66/712; B29C 66/7315; B29C 66/73151; B29C 66/73771; B29C 66/73773; C08J 5/12
See application file for complete search history.

(56) References Cited

U.S. PATENT DOCUMENTS

| | | | |
|---|---|---|---|
| 4,795,782 A | 1/1989 | Lutz et al. | |
| 5,612,097 A | 3/1997 | Foerch et al. | |
| 5,721,315 A | 2/1998 | Evans et al. | |
| 7,015,283 B2 | 3/2006 | Schauder et al. | |
| 2004/0220336 A1 | 11/2004 | Abhari et al. | |
| 2008/0292902 A1 | 11/2008 | Reid | |
| 2012/0150150 A1* | 6/2012 | Cai .................. | F16L 33/34 |
| | | | 604/524 |
| 2014/0283940 A1 | 9/2014 | Bourgeois et al. | |

FOREIGN PATENT DOCUMENTS

| | | |
|---|---|---|
| CN | 1906218 A | 1/2007 |
| EP | 1233039 A1 | 8/2002 |
| EP | 2976215 A1 | 1/2016 |
| JP | H03252436 | 11/1991 |

OTHER PUBLICATIONS

International Search Report and Written Opinion for Application No. PCT/US2019/051745, dated Mar. 24, 2020, 19 pages.
Invitation to Pay Additional Fees and Partial Search Report for International Application No. PCT/US2019/051745, dated Jan. 7, 2020, 14 pages.
Arán-Aís, et al., "Addition of rosin acid during thermoplastic polyurethane synthesis to improve its immediate adhesion to PVC PVC-TPU adhesion", International Journal of Adhesion and Adhesives 25 (2005) 31-38.
Bhattacharya, et al., "Grafting: a versatile means to modify polymers", Prog. Polym. Sci. 29 (2004) 767-814.
Bongiovanni, et al., "Surface Modification of Polyethylene for improving the adhesion of a highly fluorinated UV-cured coating", European Polymer Journal 43 (2007) 3787-3794.
Gonzalez-Montiel, et al., "Impact-modified nylon 6/polypropylene blends: 1. Morphology-property relationships", *Polymer* vol. 36 No. 24, pp. 4587-4603, 1995.
Rzayev, Zakir M. O., "Graft Copolymers of Maleic Anhydride and Its Isostructural Analogues: High Performance Engineering Materials", Int. Rev. Chem. Eng., 3(2011) 153-215.
Chinese Office Action for Application No. 201980060994.7, dated Aug. 12, 2022, 14 page including translation.

* cited by examiner

*Primary Examiner* — Daniel H Lee
(74) *Attorney, Agent, or Firm* — Morgan, Lewis & Bockius LLP

(57) ABSTRACT

The present disclosure is directed to a formulations of cements and methods for bonding dissimilar materials. The formulations and methods can bond a Non-polyvinyl chloride (PVC) containing first polyolefin that is amorphous or has low crystallinity to a second material that is a rigid material or a hard PVC. The methods and formulations can work by co-dissolution at an interface, or activation of a one of the materials prior to bonding.

13 Claims, 4 Drawing Sheets

METHODS AND FORMULATIONS FOR BONDING DISSIMILAR MATERIALS

CROSS-REFERENCE TO RELATED APPLICATIONS

This application claims the benefit of U.S. Provisional Application No. 62/733,516 filed 19 Sep. 2018, the entire disclosure of which is hereby incorporated by reference herein.

BACKGROUND

Field

The present disclosure relates to the field of polymeric materials. More specifically, the present disclosure relates to dissimilar polymeric materials and bonds or adhesive formulations for binding the same.

Background

Various grafting techniques for increasing the surface energy or compatibilizing the dissimilar materials are known in the prior art [1,2,4,6,7,9,10]. Bonding dissimilar materials are hard to achieve due to differences in chemistry. Particularly, bonding polyolefin based materials are challenging due to low surface energy requiring primer applications with adhesives or special surface treatments before bonding. Prior art includes examples of modification techniques or grafting and specific formulations to increase the adhesion between a functionalized polyolefin and various coatings, paints, and adhesives [3, 5, 11].

Particularly, EP 1233039 describes a modified polyolefin formulation (based on thermoplastic olefin) that includes grafting of a functional group with one ester and at least one hydroxyl and/or one oxirane groups to improve adhesion to coatings and adhesives. Use of cement and primer in industry is known for joining polyvinyl chloride (PVC) piping and pipe fittings. For example, U.S. Pat. No. 6,613,187B1, describes a cement technique for bonding polyolefinic materials with each other or bonding similar materials and low crystalline polymers to low crystalline polymer. However, this disclosure does not describe methods or formulations that achieve bonding of dissimilar materials having divergent chemical and material characteristics (e.g., crystallinity, polarity, etc.).

SUMMARY

The techniques disclosed herein advantageously can achieve higher grafting density than the commercially available grafted polyolefins (typically 1 wt % maximum). Moreover, the techniques herein can eliminate the need for primer and an extra step of its application, and, the utilization of expensive adhesives before adhering dissimilar materials. Advantageously, common and inexpensive solvents can be used for joining parts that are suitable for high volume manufacturing or part assembly. Additional advantages can include minimal changes in bulk properties of assembled parts such as clarity and suitability for medical delivery (e.g., low extractable/leachable) applications.

In addition, methods described herein relate to the challenges of bonding dissimilar polymeric materials. In particular, those methods are formulated to improve adhesion between a low crystalline polyolefin (thermoplastic elastomer, thermoplastic olefin, etc.) and a rigid amorphous material or a low crystalline polyvinyl chloride (PVC). In addition, disclosed methods allow the use of inexpensive solvents, which are practical to use in high volume manufacturing, avoid separate primer application or heating steps. Even though specific use examples include the medical industry, these solutions have wide application potentials in other industries.

In one embodiment, a bonding agent is provided for adhering a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; and the bonding agent comprises one or more polymers, e.g., an ethylene vinyl acetate copolymer, a polyolefin elastomer, which can be up to 51 wt % or more, and a solvent or group of solvents forming a solvent system and optionally a tackifier. The bonding agent works to bond the dissimilar materials upon exposure to heat under using conventional sterilization methods.

In another embodiment, a method is provided of bonding a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; the method comprising: i.) modifying the first material with a polar functional group, the polar functional group increasing an affinity of the first material to the second material; and ii.) bonding the first material to the second material. This method works via modification of the base Non-PVC material with highly polar functional groups to increase its chemical affinity to the second material and its ability to be chemically bonded via suitable solvent or solvent systems.

In another embodiment, a method is provided of bonding a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; the method comprising: i.) providing a bonding agent, the bonding agent comprising one or more of the group consisting of: a.) an organic solvent or solvent mixture capable of dissolving the first material and the second material; b.) a blend of the first material and the second material; c.) a polymeric material selected from a polypropylene (PP), a thermoplastic olefin (TPO), and a thermoplastic elastomer (TPE), the polymeric material being functionalized with a polar group; and ii.) bonding the first material to the second material using the bonding agent.

In another embodiment, a method is provided of bonding a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; the method comprising: i.) modifying the first material using at least one technique from the group consisting of: a.) mixing the first material with up to about 51 wt % of a functionalized polymer; b.) mixing the first material with up to about 5 wt % of a secondary compatibilizer; c.) mixing the first material with up to about 5 wt % of an adhesion promoter; d.) mixing the first material with up to about 5 wt % of an ethylene acrylic acid copolymer; and ii.) bonding the modified first material to the second material.

Related aspects include the utilization of other methods covering similar technical principles. For example, the Non-PVC material polarity may be increased using surface deposition techniques to graft functional groups to increase polarity. One example includes the use of atmospheric plasma deposition techniques in order to deposit polar chemical groups such as maleic anhydride, acrylic acid or similar reagents on the Non-PVC surface. This technique allows modification of the Non-PVC surface while preserving the desired bulk properties of the material (rheology, mechanical, clarity, etc.). The methods disclosed herein can also be optimized for processing via conventional processing equipment.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE DRAWINGS

Various features of illustrative embodiments of the inventions are described below with reference to the drawings. The illustrated embodiments are intended to illustrate, but not to limit, the inventions. The drawings contain the following figures.

DETAILED DESCRIPTION

Figure 1:
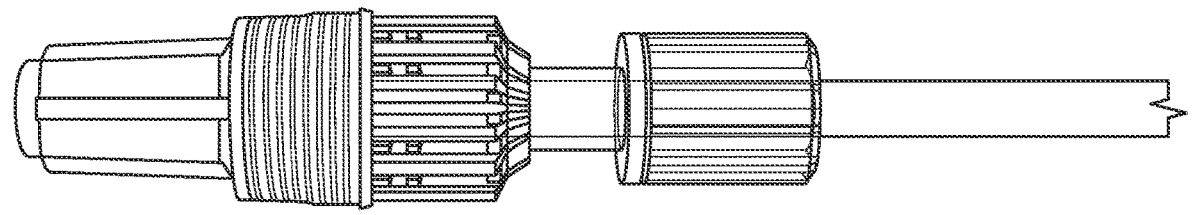
FIG. 1 shows a Luer—Tubing Assembly bonded with Degalan® Functionalized Olefin Copolymer described in Example 1.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In one embodiment, a bonding agent is provided for adhering a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; and the bonding agent comprises one or more polymers, e.g. an ethylene vinyl acetate copolymer, a polyolefin elastomer, which can be up to 51 wt % or more, and a solvent or group of solvents forming a solvent system and optionally a tackifier.

The degree of crystallinity of a solid material, such as a polymeric solid, can be determined by any suitable means. "Crystallinity" refers to the degree of structural order in a solid. In a crystal, the atoms or molecules are arranged in a regular, periodic manner. The degree of crystallinity will affect the solid's hardness, density, and transparency. The order of a crystalline material can be understood by the contrasting the positions of atoms in a gaseous state, in which the relative positions of atoms or molecules are completely random. "Amorphous" materials, such as liquids and glasses, represent an intermediate case, having order over short distances (a few atomic or molecular spacings) but not over longer distances.

Some polymeric materials can be prepared in such a way as to produce a mixture of crystalline and amorphous regions. In such cases, crystallinity is usually specified as a percentage of the volume of the material that is crystalline. Crystallization of polymers is a process associated with partial alignment of their molecular chains. These chains fold together and form ordered regions called lamellae, which compose larger spheroidal structures named spherulites.https://en.wikipedia.org/wiki/Crystallization_of_polymers-cite_note-sp-1 Polymers can crystallize upon cooling from the melt, mechanical stretching or solvent evaporation. Crystallization affects optical, mechanical, thermal and chemical properties of the polymer. The degree of crystallinity is estimated by different analytical methods and it typically ranges between 10 and 80%, thus crystallized polymers are often called "semi-crystalline". The properties of semi-crystalline polymers are determined not only by the degree of crystallinity, but also by the size and orientation of the molecular chains.

One technique for determining the degree of crystallinity for a polymeric solid is differential scanning calorimetry (DSC). DSC is a technique that measures heat flow into or out of a material as a function of time or temperature. Polymer crystallinity can be determined with DSC by quantifying the heat associated with melting (fusion, $\Delta H_{fusion}$) of the polymer. This heat is reported as Percent Crystallinity by normalizing the observed heat of fusion to that of a 100% crystalline sample of the same polymer. As authentic samples of 100% crystalline polymer are rare, literature values are often used for this value. In some embodiments, the first material comprises a non-polyvinyl chloride (Non-PVC) polyolefin polymer characterized by DSC at a rate of 10° C./min as having a heat of fusion of less than about 59 J/g, when integrating the DSC peak for fusion. In some embodiments, the first material comprises a non-polyvinyl chloride (Non-PVC) polyolefin polymer characterized by DSC as having a heat of fusion of less than about 23 J/g.

In some embodiments, the first material comprises a non-polyvinyl chloride (Non-PVC) polyolefin polymer having a degree of crystallinity in the range of about 0.1% to about 50%, about 1% to about 45%, about 5% to about 40%, about 10% to about 30%, about 1% to about 30%, about 5% to about 25% crystallinity.

The second material comprises a rigid amorphous material having a tensile modulus in the range of about 1800 to about 3000 MPa, a PVC having a Shore A hardness in the range of about 70 to about 85, or a combination thereof. A person of ordinary skill in the art will recognize how to determine a tensile modulus or a Shore A hardness. Tensile modulus is a mechanical property that measures the stiffness of a solid material. It defines the relationship between stress (force per unit area) and strain (proportional deformation) in a material in the linear elasticity regime of a uniaxial deformation. A solid material will undergo elastic deformation when a small load is applied to it in compression or extension. Elastic deformation is reversible (the material returns to its original shape after the load is removed).

At near-zero stress and strain, the stress-strain curve is linear, and the relationship between stress and strain is described by Hooke's law that states stress is proportional to strain. The coefficient of proportionality is the tensile modulus. The higher the modulus, the more stress is needed to create the same amount of strain; an idealized rigid body would have an infinite tensile modulus. Mathematically, the tensile modulus can be expressed as: $E=\sigma/\epsilon$, where E is the tensile modulus (typically expressed in Pa, kPa, or MPa), $\sigma$ is the uniaxial stress, or uniaxial force per unit surface, and $\epsilon$ is the strain, or proportional deformation (change in length divided by original length) (adimensional).

Hardness is typically measured using a Shore durometer. Higher numbers in a Shore scale indicate a greater resistance to indentation, and thus harder materials, while lower are less resistant and softer. There are several scales of durometer, used for materials with different properties. The two most common scales, using slightly different measurement systems, are the ASTM D2240 type A and type D scales. Durometer, like many other hardness tests, measures the depth of an indentation in the material created by a given force on a standardized presser foot. This depth is dependent on the hardness of the material, its viscoelastic properties, the shape of the presser foot, and the duration of the test. ASTM D2240 durometers allows for a measurement of the initial hardness, or the indentation hardness after a given period of time. The basic test requires applying the force in a consistent manner, without shock, and measuring the hardness (depth of the indentation). If a timed hardness is desired, force is applied for the required time and then read. Values on the scale are between 0 and 100. Materials characterized herein with a hardness are measured on the ASTM D2240 scale.

In some embodiments, the Non-PVC polyolefin polymer is a styrenic based thermoplastic elastomer (TPE) or a styrenic based thermoplastic olefin (TPO). In some embodiments, the rigid amorphous material comprises a polycarbonate or copolymer thereof, a polyacrylate or copolymer thereof such as a methylmethacrylate-acrylonitrile-butadiene-styrene (mABS) copolymer, or an acrylonitrile butadiene styrene (ABS) or copolymer thereof, or a derivative of any of the foregoing. Throughout this disclosure, the term "derivative" includes, but is not limited to an ester, amide, imide, or anhydride of the structure referenced as having a derivative.

In some embodiments, the solvent or solvent system is configured to be applied via a solvent dispenser, dip coating, or manual application. Suitable solvents or solvent systems for use in the present disclosure include, but are not limited to solvents or solvent combinations comprising cyclohexanone, methyl ethyl ketone, cyclohexane, ethyl acetate, isobutyl acetate, n-butyl acetate, methyl isobutyl ketone, tetrahydrofuran, heptane, and any combination thereof.

In some embodiments, the bonding agent is stable to sterilization processing temperatures up to about 60° C.

In some embodiments, the bonding agent further comprises up to 5 wt % of an organosol-modified polypropylene dispersion, up to 3 wt % of one or more tackifiers, or both. Suitable tackifiers include, but are not limited to, a terpene phenol, a styrenated terpene, a rosin ester, a terpene resin, and a hydrocarbon resin.

In some embodiments, a method is provided comprising application of the bonding agent to form a bond between the first material and the second material. Application of the bonding agent can comprise application via a solvent dispenser, dip coating, or manual application. After application of the bonding agent, the bonded system can be sterilized at a temperature in the range of about 40° C. to about 60° C., which can aid in curing the cement to and strengthen the bond.

In a second embodiment, a method is provided of bonding a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; the method comprising: i.) modifying the first material with a polar functional group, the polar functional group increasing an affinity of the first material to the second material; and ii.) bonding the first material to the second material. In the method of this embodiment, the first and second materials can have the same characteristic as those described above in the embodiment of the bonding agent.

In some embodiments, the Non-PVC polyolefin polymer is a styrenic based thermoplastic elastomer (TPE) or a styrenic based thermoplastic olefin (TPO). In some embodiments, the rigid amorphous material comprises a polycarbonate or copolymer thereof, a polyacrylate or copolymer thereof such as a methylmethacrylate-acrylonitrile-butadiene-styrene (mABS) copolymer, or an acrylonitrile butadiene styrene (ABS) or copolymer thereof, or a derivative of any of the foregoing.

In some embodiments, the first material is modified by grafting the polar functional group to the first material via a reactive extrusion. In some embodiments, the reactive extrusion comprises first activating the first material with an initiator to provide an activated material. "Initiators" are reagents that can produce radical species under mild conditions and promote radical reactions. These substances generally possess weak bonds that have small bond dissociation energies. Examples include halogen molecules, azo compounds, and organic and inorganic peroxides. In some embodiments, the initiator is a peroxide. In some embodiments, the initiator is selected from benzyl peroxide, dicumyl peroxide, or 2,2'-Azobisisobutyronitrile.

In some embodiments, the polar functional group is formed from reacting with a monomeric compound comprising at least one ester group. In some embodiments, the monomeric compound comprises a carbon-carbon double bond capable of reacting with the activated material. In some embodiments, the monomeric compound is selected from the group consisting of methyl methacrylate, glycidyl methacrylate, and vinyl acetate.

In some embodiments, the reactive extrusion is conducted in a melted state of the first material.

In some embodiments, modifying the first material comprises grafting a monomeric compound comprising the polar functional group to the first material using one or more tackifiers. Suitable tackifiers have been described above. In some embodiments, the one or more tackifiers is selected from the group consisting of a terpene phenol, a styrenated terpene, a rosin ester, a terpene resin, and a hydrocarbon resin.

In some embodiments, the monomeric compound comprises an isoprene having a carbon-carbon double bond capable of reacting with the activated material.

In some embodiments, the method further comprises integration of the modified material to the second material via dissolution at the interface due to a solvent or solvent system. In some embodiments, the solvent or solvent system comprises a solvent selected from the group consisting of cyclohexanone, methyl ethyl ketone, cyclohexane, ethyl acetate, isobutyl acetate, n-butyl acetate, methyl isobutyl ketone, tetrahydrofuran, heptane, and any combination thereof.

In some embodiments, modifying the first material further comprises combining with up to about 10 wt % of a secondary compatibilizer selected from polyether amine, ethylene-vinyl acetate (EVA), or both, wherein the secondary compatibilizer increases the polarity of the first material. In some embodiments, modifying the first material further comprises combining with up to about 10 wt % of an isoprene-based tackifier. In some embodiments, the isoprene-based tackifier is a terpene.

In some embodiments, modifying the first material further comprises combining with up to about 1 wt % of an antioxidant, up to about 1 wt % of a processing aid, or both. In some embodiments, the antioxidant is penterythritol tetrakis (3-(3,5-di-t-butyl-4-hydroxyphenyl)propionate), or 1, 3, 5-trimethyl-2,4,6-tris (3,5-di-tert-butyl-4-hydroxybenzyl) benzene. In some embodiments, the processing aid is selected from fatty acid amide slip agents and inorganic mineral antiblocks.

In another embodiment, a method is provided of bonding a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; the method comprising: i.) providing a bonding agent, the bonding agent comprising one or more of the group consisting of: a.) an organic solvent or solvent mixture capable of dissolving the first material and the second material; b.) a blend of the first material and the second material; c.) a polymeric material selected from a polypropylene (PP), a thermoplastic olefin (TPO), and a thermoelastic elastomer (TPE), the polymeric material being functionalized with a polar group; and ii.) bonding the first material to the second material using the bonding agent. The materials used in this method can be the same as those described in embodiments above.

In some embodiments, the Non-PVC polyolefin polymer is a styrenic based thermoplastic elastomer (TPE) or a styrenic based thermoplastic olefin (TPO). In some embodiments, the rigid amorphous material comprises a polycarbonate or copolymer thereof, a polyacrylate or copolymer thereof such as a methylmethacrylate-acrylonitrile-butadiene-styrene (mABS) copolymer, or an acrylonitrile butadiene styrene (ABS) or copolymer thereof, or a derivative of any of the foregoing.

In some embodiments, the polar group is selected from the group consisting of a maleic anhydride group; a glycidyl methacrylate group; an N-substituted maleimide group; a carboxylic acid containing group or an ester, amide, imide, or anhydride thereof, the carboxylic acid containing group being selected from a fumaric acid group; a citraconic acid group; and an itaconic acid group.

In some embodiments, the bonding agent comprises up to about 5 wt % of a secondary compatibilizer. In some embodiments, the secondary compatibilizer is a polyether amine. In some embodiments, the bonding agent comprises between about 3.4 and about 51 wt % of a solvent or a solvent mixture, the solvent mixture comprising a polar and a non-polar solvent. In some embodiments, the polar solvent is selected from methyl ethyl ketone (MEK), cyclohexanone, and dichloromethane, and the non-polar solvent is selected from hexane and heptane.

In some embodiments, the bonding agent further comprises an additional ingredient selected from: up to about 5 wt % of an adhesion promoter; up to about 2 wt % of a wetting agent; up to about 1 wt % of a hydrolyzing agent; up to about 5 wt % of an expandable monomeric compound; and up to about 5 wt % of a polymer selected from polyurethane, styrene butadiene rubber having a vinyl content over 10%, and ethylene vinyl acetate (EVA).

In some embodiments, the adhesion promoter is a tackifier selected from a rosin, a hydrocarbon resin, and a terpene resin. In some embodiments, the wetting agent is a functional silane. In some embodiments, the expandable monomer is a lactone. In some embodiments, the lactone is glucono delta-lactone.

In another embodiment, a method is provided of bonding a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; the method comprising: i.) modifying the first material using at least one technique from the group consisting of: a.) mixing the first material with up to about 51 wt % of a functionalized polymer; b.) mixing the first material with up to about 5 wt % of a secondary compatibilizer; c.) mixing the first material with up to about 5 wt % of an adhesion promoter; d.) mixing the first material with up to about 5 wt % of an ethylene acrylic acid copolymer; and ii.) bonding the modified first material to the second material. The materials used in this method can be the same as those described above for other embodiments.

In some embodiments, the Non-PVC polyolefin polymer is a styrenic based thermoplastic elastomer (TPE) or a styrenic based thermoplastic olefin (TPO). In some embodiments, the rigid amorphous material comprises a polycarbonate or copolymer thereof, a polyacrylate or copolymer thereof such as a methylmethacrylate-acrylonitrile-butadiene-styrene (mABS) copolymer, or an acrylonitrile butadiene styrene (ABS) or copolymer thereof, or a derivative of any of the foregoing.

In some embodiments, the functionalized polymer is selected from the group consisting of maleic anhydride (MAH) modified polypropylene co- or homo-polymer, MAH-modified polyolefin elastomer or plastomer, ethylene acrylic ester-maleic anhydride terpolymers, methacrylic esters grafted on olefin copolymers, MAH functionalized styrene ethylene butylene styrene (SEBS), and a linear triblock 13% styrene ethylene butylene 30% styerene copolymer. In some embodiments, the functionalized polymer is a polyether amine.

In some embodiments, the adhesion promoter is a tackifier or EVA.

In some embodiments, the modified material is formulated for optimized processing via conventional processing equipment while preserving the bulk properties of the modified material (e.g., molecular weight, crystallinity, dispersity, molecular structure, hardness, tensile modulus, etc.).

In another embodiment, a method is provided of bonding a first material to a second material, the first and second materials being dissimilar, wherein the first material comprises a non-polyvinyl chloride (Non-PVC) polyolefin polymer, wherein the Non-PVC polyolefin polymer is amorphous or has a degree of crystallinity in the range of about 0.1% to about 50% crystallinity; the second material comprises a rigid amorphous material having a tensile modulus in the range of about 1800 to about 3000 MPa, a PVC having a Shore A hardness in the range of about 70 to about 85, or a combination thereof; the method comprising: i.) providing a bonding agent, the bonding agent comprising a solvent-free polymeric material; ii.) melting the bonding agent; and iii.) bonding the first material to the second material using the melted bonding agent. The materials used in this method can be the same as those used in embodiments described above.

In some embodiments, the Non-PVC polyolefin polymer is a styrenic based thermoplastic elastomer (TPE) or a styrenic based thermoplastic olefin (TPO). In some embodiments, the rigid amorphous material comprises a polycarbonate or copolymer thereof, a polyacrylate or copolymer thereof such as a methylmethacrylate-acrylonitrile-butadiene-styrene (mABS) copolymer, or an acrylonitrile butadiene styrene (ABS) or copolymer thereof, or a derivative of any of the foregoing. In some embodiments, the bonding agent further comprises a tackifier. In some embodiments, the solvent-free polymeric material is ethylene vinyl acetate (EVA), a maleic anhydride grafted polyolefin elastomer, a maleic anhydride grafted plastomer, a thermoplastic polyurethane, and a hydrogenated styrenic block copolymer.

EXAMPLES

Example 1

Figure 2:
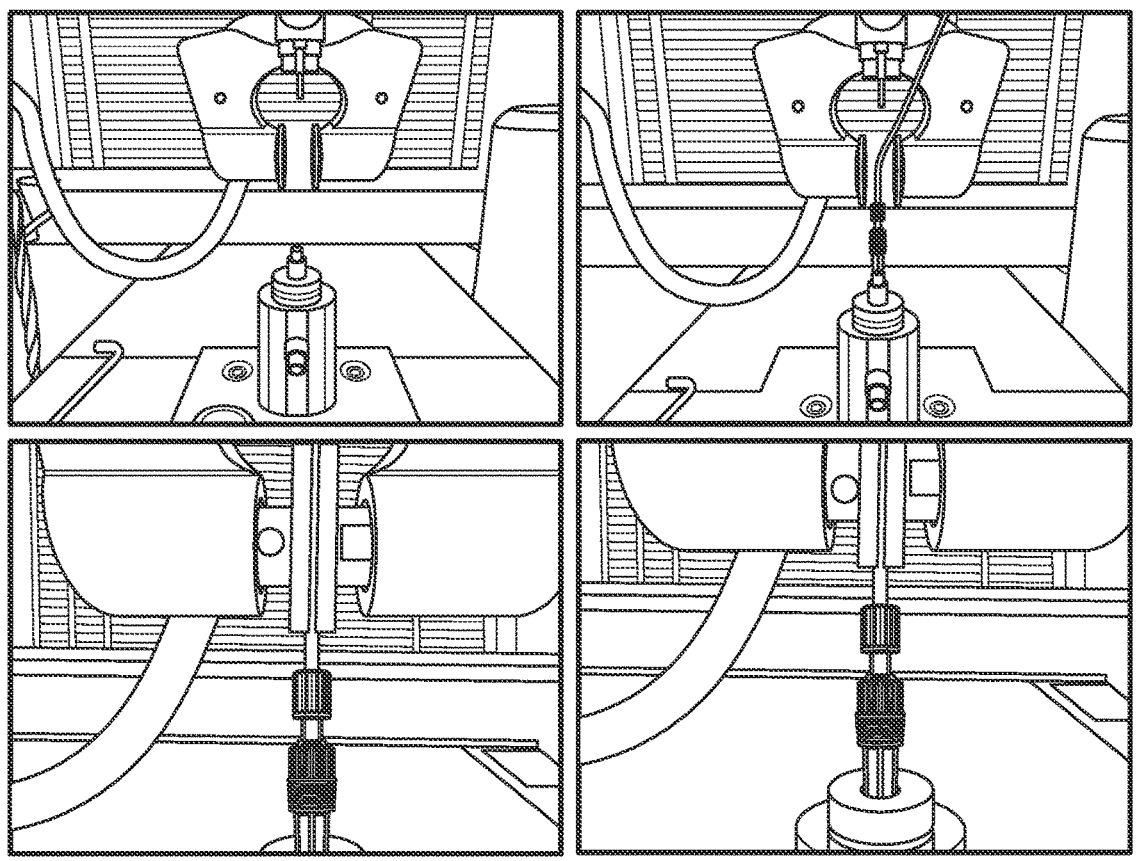
FIG. 2 shows a Bond Force Test Apparatus and Sample Placement therein as described in Example 1.

Degalan® is a methacrylic ester grafted on olefin copolymers dispersed in organic solvents. Degalan® was either used as-obtained and applied directly on the tube via a cotton swab or diluted within cyclohexanone solvent before applying on the tube. A Luer assembly was used to test the bonding method to a PVC. Bond force was measured utilizing a mechanical tester equipped with 500 N load cell keeping a gap of 0.25" between the jaw and the adapter of the luer. Results are shown in Table 1. FIG. 1 indicates the assembled luer and hosing. Test speed was 1 inch/minute. Force was measured using a 500 N load cell in an Instron (model 5500Q1979). FIG. 2 shows the test apparatus and the assembled luer and hosing placed therein.

TABLE 1

Bond Force Results with Degalan ® and solvent trials.

| Solvent | Polymer | Sample Composition | Final Solid content*, wt % | Bond Force, lbf (n = 5) | % Increase from Control |
|---|---|---|---|---|---|
| Cyclohexanone (CH) | Degalan4322 | 0.3 cc Degalan mixed with 3 cc CH | 3.4 | 6.5 +/− 0.7 | 15.1 |
| None | Degalan4322 | As-is | 40 | 10.3 +/− 0.9 | 81.7 |
| MEK | None | As-is | 0 | 5.4 +/− 0.3 | Not Applicable |
| Cyclohexanone | Degalan4294 | 0.2 cc Degalan mixed with 2 cc CH | 3.6 | 5.2 +/− 0.3 | No increase |
| None | Degalan4294 | As-is | 51 | 8.9 +/− 1.4 | 57.0 |
| Cyclohexanone | None | As-is | 0 | 5.7 +/− 0.3 | Control |

*Calculated

Example 2

Xiameter™ Silane wetting agents from Dow Corning were used to improve bonding between Thermoplastic Elastomer tubing made with Teknor Apex Medalist MD575 and T-Style polycarbonate connector made with 50/50 Makrolon 2458/Makrolon Rx1805. The different types of silane agents used are listed in Table 2. The bonds were then assessed for their strength as further described below.

TABLE 2

Silane Agents used for Experimentation.

| | Agent Type | CAS# | Chemical |
|---|---|---|---|
| OFS-2306 | Alkyl | 18395-30-7 | i-Butyl trimethoxy silane |
| OFS-6020 | Amine | 1760-24-3 | N-(2-Aminoethyl)-3-aminopropyltrimethoxysilane |
| OFS-6030 | Methacryloxy | 2530-85-0 | 3-Methacryloxypropyltrimethoxysilane |
| OFS-6040 | Epoxy | 2530-83-8 | 3-Glycidoxy propyl trimethoxy silane |
| OFS-6300 | Vinyl | 2768-02-7 | Vinyltrimethoxysilane |

Example 3

Figure 3:
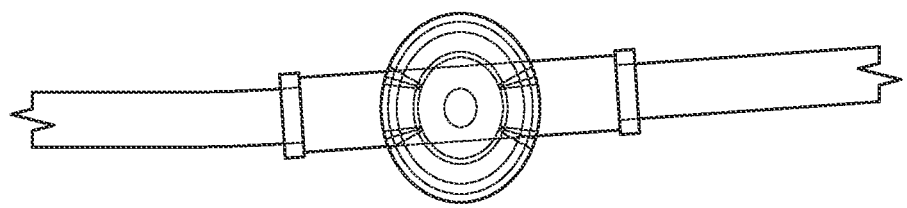
FIG. 3 shows a T-style Polycarbonate Connector made with 50/50 Makrolon 2458/Makrolon Rx1805 bonded to Thermoplastic Elastomer tubing made with Teknor Apex Medalist MD575 according to the method of Example 2.

In the experiment, 10 ml of tetrahydrofuran (THF) was injected into a 20 ml glass bottle. 15 μl of acetic acid was added to accelerate hydrolysis of the reagent. Aliquots of silane coupling agents were injected into the solution and mixed for 5 minutes to ensure completion of hydrolysis. The tubing was dipped into the solution, agitated gently and removed after 1 to 2 min. The tube was then inserted into the connector. An example of an assembled sample is shown in FIG. 3. These samples were stored for two days to allow curing to go to completion.

Figure 4:
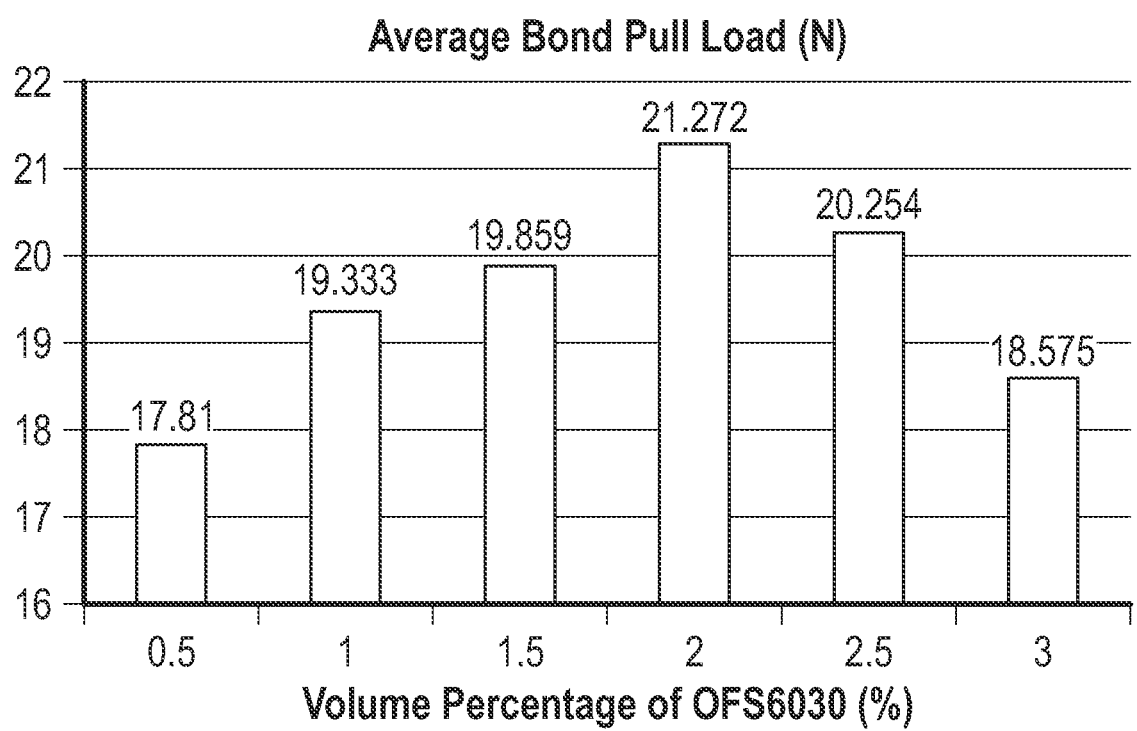
FIG. 4 shows a graph of the average bond pull load of different concentrations of OFS6030 solution from the experiment of Example 2.

The samples were then subjected to simulate ethylene oxide (oxirane) by heating at 60° C., 30% relative humidity for 5 hours. The samples were then stored at room temperature for 5 days. An Instron test with train rate of 254 mm/min was conducted on the samples for recording the maximum load before break. In the experiment, 2% volume concentration of silane solutions were tested. Tables 3 and 4 summarize the data that indicated a statistically significant increase in bond force with the use of OFS6020, OFS6030 and OFS6300. A graph of the average pull strength for the different silanes is shown in FIG. 4.

TABLE 3

Summary of Bond Force Data with Silane Wetting Agents.

| Agent | Density at 25° C. (g/mL) | Volume % | wt % in THF solution | Bond Force, N | % Increase in Average Bond Force |
|---|---|---|---|---|---|
| THF | 0.888 | 100 | NA | 17.8 | Control |
| OFS2306 | 0.92 | 2 | 2.1 | 16.3 | No increase |
| OFS6020 | 1.03 | 2 | 2.4 | 13.9 | No increase |
| OFS6030 | 1.04 | 2 | 2.4 | 20.1 | 12.9 |
| OFS6040 | 1.07 | 2 | 2.5 | 19.4 | 9.5 |
| OFS6300 | 0.97 | 2 | 2.2 | 20.8 | 17.0 |

TABLE 4

Statistical significance of wetting agent on bond force.

| | Solvent (THF) | OFS2306 | OFS6020 | OFS6030 | OFS6040 | OFS6300 |
|---|---|---|---|---|---|---|
| Mean | 17.767 | 16.276 | 13.925 | 20.061 | 19.448 | 20.846 |
| SD | 1.723 | 2.839 | 3.408 | 1.346 | 1.907 | 3.247 |
| Max | 19.494 | 18.869 | 18.418 | 21.884 | 21.922 | 26.794 |
| Min | 13.537 | 9.01 | 7.375 | 18.406 | 16.191 | 16.282 |
| n (participants) | 10 | 10 | 10 | 10 | 10 | 10 |
| variance | 2.968 | 8.060 | 11.614 | 1.812 | 3.637 | 10.543 |
| P(T <= t) two-tail | 1 | 0.176586 | 0.007042 | 0.004057 | 0.053422 | 0.019334 |

Example 3—A heat aging study was conducted to understand the effects of the typical sterilization processing conditions on bond force. The same materials were utilized as in Example 1 with additional variables such as dilution, diluent or solvent type, oven temperature and heating time. DEGALAN® VP 4322 E and 4294 E received from Evonik were diluted with methyl isobutyl ketone or cyclohexanone at the volume ratios described in Table 1. Cotton wrapped Q-tip was used to apply the Degalan solution onto the outside surface of the tubing. Tubing was manually assembled with the luer connector made of mABS Terlux® 2802TR. Samples were put in the oven set at 32° C. and 55° C. ranging from 1 to 6 days. Same mechanical tester and pull force test conditions were used as in Example 1. Results show that the bond force increases as a function of oven temperature. Heating time, dilution % or diluent type didn't make statistically significant change on the bond force.

TABLE 5

Dilution Volume Ratio.

| Dilution % | Degalan Volume | Solvent Volume for Dilution |
|---|---|---|
| Dilution 0% | 10 cc | NA |
| Dilution 30% | 10 cc | 3 cc |
| Dilution 60% | 10 cc | 6 cc |

TABLE 6

Effects of Heat

Figure 5:
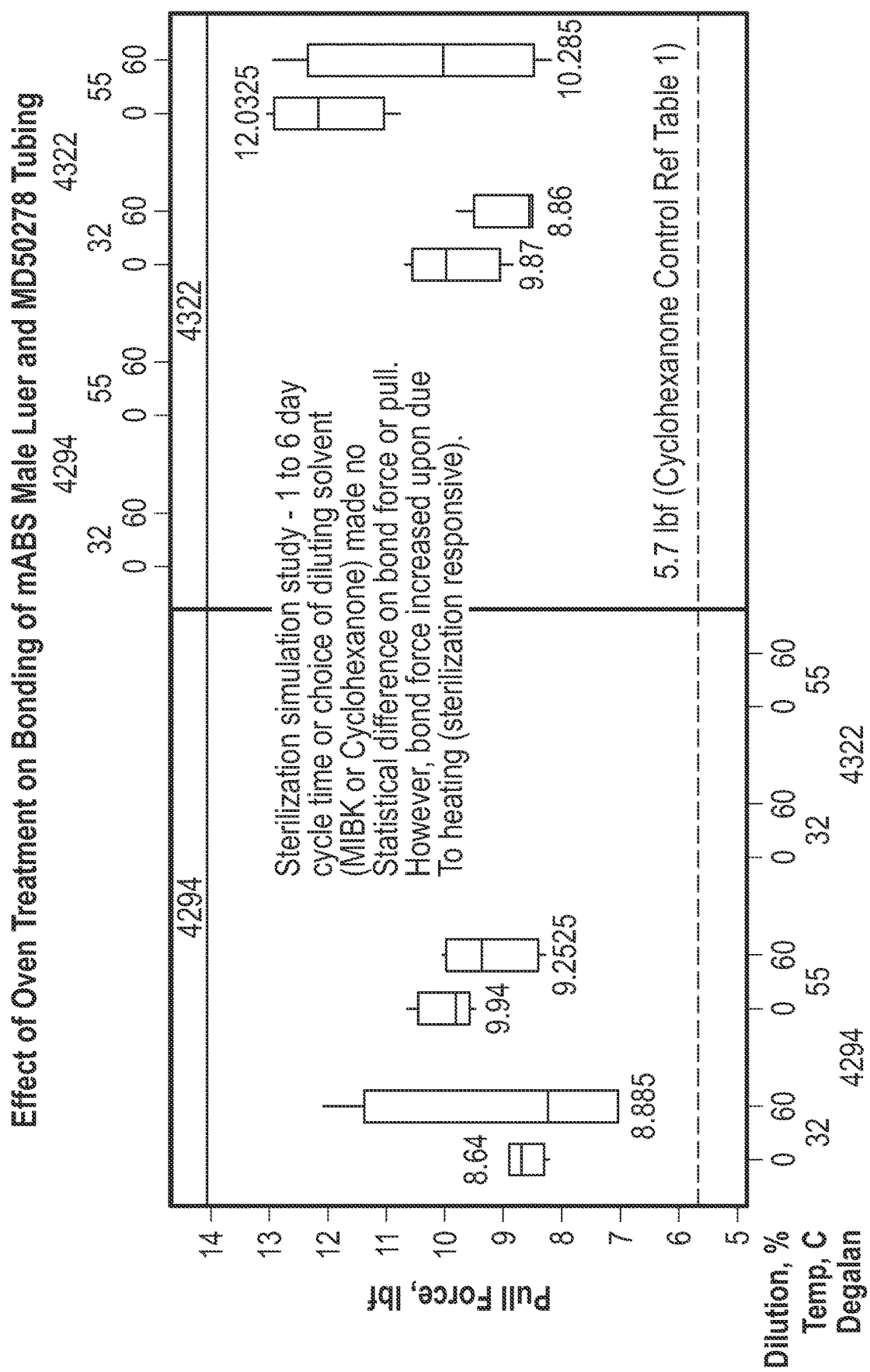
FIG. 5 shows a graph of bond force as a function of oven temperature for the materials in Example 1.

| Degalan® | Condition | Average Bond Force, lbf | % Change in Bond Force |
|---|---|---|---|
| None | Cyclohexanone | 5.7 (Ref Table 1) | Control |
| 4322 | As-is | 10.3 (Ref Table 1) | 81.7 (Ref Table 1) |
| 4294 | As-is | 8.9 (Ref Table 1) | 57.0 (Ref Table 1) |
| 4322 | As-is, Heated at 55° C.* | 12.03, FIG. 5 | 111 |
| 4294 | As-is, Heated at 55° C.* | 9.94, FIG. 5 | 74 |

*Heated from 1 to 6 days.

Example 4

Figure 6:
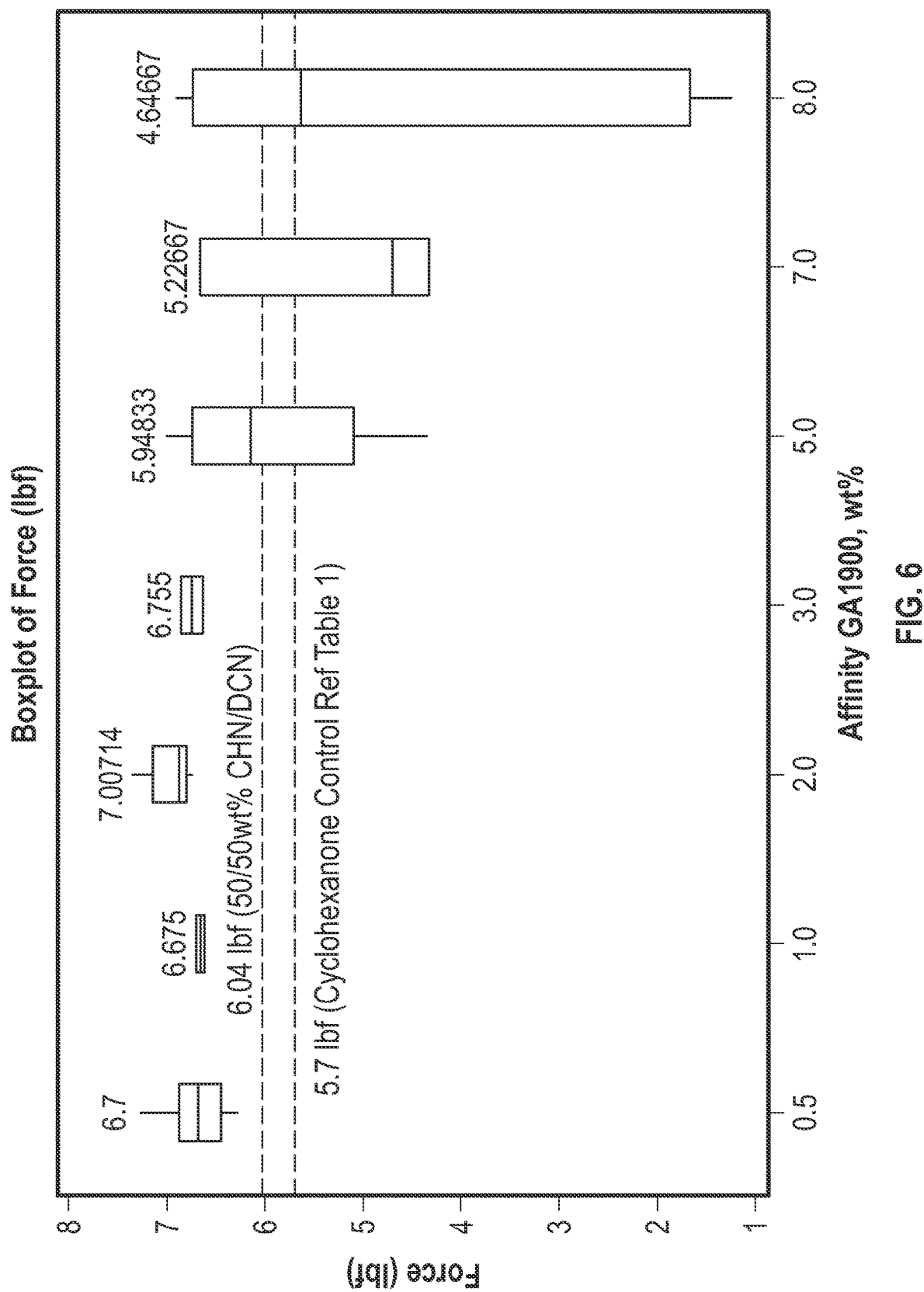
FIG. 6 is a plot of force to affinity with certain components in the bonding agent.

Example 4. Various formulations were prepared utilizing Regalite™ R1100 tackifying hydrocarbon resins by Eastman, DuPont™ Elvax® 150 is an ethylene-vinyl acetate copolymer or EVA resin, Dupont AFFINITY™ GA 1900 Polyolefin Elastomers (POEs) at different ratios, as shown in Table 7. AFFINITY™ GA 1900 represent a functionalized polyolefin with maleic anhydride grafting and 1000 g/10 min melt flow index @ 190° C. and 2.16 kg test condition according to the vendor. Formulations were dissolved in cyclohexanone (CHN) and dichloroethane (DCN). Cotton wrapped Q-tip was used to apply the formulations onto the outside surface of the tubing. Tubing was manually assembled with the luer connector made of mABS Terlux® 2802TR and the Y-site connector made of CYRO GS90 acrylic multi-polymer. Some of the samples were put in the oven set at 60° C. for 15 hr according to Table 7. Same mechanical tester and pull force test conditions were used as in Example 1. Table 7 shows that formulations with POEs show increase in bond force up to 3 wt %. Bond force decreased and variation increased when the POE composition was at and above 5 wt %, FIG. 6. In addition to the POE composition indicated within FIG. 6, those formulations contain Elvax150 @ 0.5%, R1100 @ 0.1 wt % and the rest with the equal wt % of CHN and DCN. Results in Table 7 also show that C5 formulation containing tackifier R1100 increased bond force after heating at 60° C. as representative of sterilization processing condition.

TABLE 7

Experimental Design with POE formulations.

| Sample Group | Part | Part Material | Sample | Pull Force, lbf | n | % Change in Pull Force |
|---|---|---|---|---|---|---|
| A3 | Luer | mABS | Affinity GA 2%, Elvax150 0.5%, R1100 0.1 wt %, 48.7 wt % CHN, 48.7 wt % DCN | 6.8 | 3 | 19.3 |
| A3 OT | Luer | mABS | A3 Oven Treated at 60° C. for 15 hr | 7.2 | 3 | 26.3 |
| A4 | Luer | mABS | Affinity GA 3%, Elvax150 0.5%, R1100 0.1 wt %, 48.2 wt % CHN, 48.2 wt % DCN | 6.8 | 3 | 19.3 |
| Control | Luer | mABS | CHN (Ref Table 1) | 5.7 | 5 | Baseline |
| Control | Luer | mABS | MEK (Ref Table 1) | 5.4 | 5 | NA |
| C5 OT | Y-site | Acrylic | C5 Oven Treated at 60° C. for 15 hr | 6.73 | 3 | 11.4 |
| C5 | Y-site | Acrylic | 2.5 wt % R1100, 48.75 wt % CHN, 48.75 wt % DCN | 5.94 | 3 | No change |
| C3 | Y-site | Acrylic | 50/50 wt/wt CHN/DCN | 6.04 | 3 | Baseline |

FURTHER CONSIDERATIONS

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

In one or more aspects, the terms "about," "substantially," and "approximately" may provide an industry-accepted tolerance for their corresponding terms and/or relativity between items, such as from less than one percent to five percent.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the detailed description contains many specifics, these should not be construed as limiting the scope of the subject technology but merely as illustrating different examples and aspects of the subject technology. It should be appreciated that the scope of the subject technology includes other embodiments not discussed in detail above. Various other modifications, changes and variations may be made in the arrangement, operation and details of the method and apparatus of the subject technology disclosed herein without departing from the scope of the present disclosure. Unless otherwise expressed, reference to an element in the singular is not intended to mean "one and only one" unless explicitly stated, but rather is meant to mean "one or more." In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

REFERENCES

1. Intern Review of Chem Eng Vol 3, No 2, March 2011, 153-215, Graft Copolymers of Maleic Anhydride and Its Isotructural Analogues
2. "Prog Polym Sci 29 (2004) 767-814, Grafting a versatile means to modify polymers"
3. European Polym Journal, 43, 2007, 3787-3794, Surface Modification of Polyethylene for improving the adhesion of a highly fluorinated UV-cured coating.
4. U.S. Pat. No. 5,721,315
5. International Journal of Adhesion and Adhesives 25 (2005) 31-38, Addition of rosin acid during thermoplastic polyurethane synthesis to improve its immediate adhesion to PVC PVC-TPU adhesion
6. U.S. Pat. No. 4,795,782
7. Polymer Vol. 36 pages 4587-4603, 1995
8. U.S. Pat. No. 7,015,283
9. JP-03252436
10. U.S. Pat. No. 5,612,097
11. EP 1233039A1

What is claimed is:

1. A method of bonding a first material to a second material with a bonding agent, the first and second materials being dissimilar, wherein
    the first material comprises a non-polyvinyl chloride (Non-PVC) polyolefin polymer, a styrene-based thermoplastic elastomer (TPE) or a styrene-based thermoplastic olefin (TPO);
    the second material comprises a rigid amorphous material having a tensile modulus in the range of about 1800 to about 3000 MPa, a PVC having a Shore A hardness in the range of about 70 to about 85, or a combination thereof; and
    the bonding agent comprises an ethylene vinyl acetate copolymer, a polyolefin elastomer, a tackifer and a solvent;
    the method comprising applying the bonding agent to either or both of the first or the second material to form a bond between the first material and the second material, and
    after application of the bonding agent, sterilizing the first and second material under heat.

2. The method of claim 1, wherein the first material comprises the Non-PVC polyolefin.

3. The method of claim 1, wherein after application of the bonding agent, sterilizing the first and second material is at a temperature in the range of about 40° C. to about 60° C.

4. The method of claim 1, wherein the rigid amorphous material comprises a polycarbonate or a polyacrylate or copolymers thereof.

5. The method of claim 1, wherein the first material comprises the styrene-based thermoplastic elastomer (TPE).

6. The method of claim 1, wherein the first material comprises the styrene-based thermoplastic olefin (TPO).

7. The method of claim 1, wherein the second material comprises the rigid amorphous material.

8. The method of claim 1, wherein the second material comprises the PVC.

9. The method of claim 1, wherein the rigid amorphous material comprises a methylmethacrylate-acrylonitrile-butadiene-styrene (mABS) copolymer, or an acrylonitrile butadiene styrene (ABS).

10. The method of claim 1, wherein the tackifier comprises a terpene phenol, a styrenated terpene, a rosin ester, a terpene resin, or a hydrocarbon resin.

11. The method of claim 1, wherein the solvent s selected from the group consisting of cyclohexanone, methyl ethyl ketone, cyclohexane, ethyl acetate, isobutyl acetate, n-butyl acetate, methyl isobutyl ketone, tetrahydrofuran, heptane, and any combination thereof.

12. The method of claim 1, wherein the bonding agent comprises up to 51 wt % of the polyolefin elastomer.

13. The method of claim 1, wherein the bonding agent further comprises one or more of: up to about 5 wt % of an adhesion promoter; up to about 2 wt % of a wetting agent; up to about 1 wt % of a hydrolyzing agent; up to about 5 wt % of an expandable monomeric compound; and up to about 5 wt % of a polymer.

* * * * *